United States Patent [19]
Budke et al.

[11] 3,971,113
[45] July 27, 1976

[54] PRE-SHARPENED CUTTING TIP FOR SAW PLATE

[75] Inventors: Robert L. Budke; Lowell C. Freeborn, both of Seattle, Wash.

[73] Assignee: Systi-Matic Company, Seattle, Wash.

[22] Filed: July 2, 1975

[21] Appl. No.: 592,403

[52] U.S. Cl. .................................. 29/95 R; 83/855
[51] Int. Cl.² .......................................... B27B 33/12
[58] Field of Search ............. 29/95 R, 95.4; 83/835, 83/855, 854

[56] References Cited
UNITED STATES PATENTS
2,714,317   8/1955   Drake ............................. 83/855 X

*Primary Examiner*—Frank T. Yost
*Attorney, Agent, or Firm*—Seed, Berry, Vernon & Baynham

[57] ABSTRACT

A pre-sharpened cutting tip for brazing onto the working edge of a saw plate. The upper end of the tip contains the pre-sharpened cutting edge. The lower end of the tip has a width equal to that of the cutting edge. The midsection of the tip is of reduced width for decreasing the friction between the tip and the workpiece during sawing. Since both ends of the tip are of equal width, the tip can be accurately located with reference to the parallel sides of the saw plate for brazing the tips onto the saw plate.

6 Claims, 8 Drawing Figures

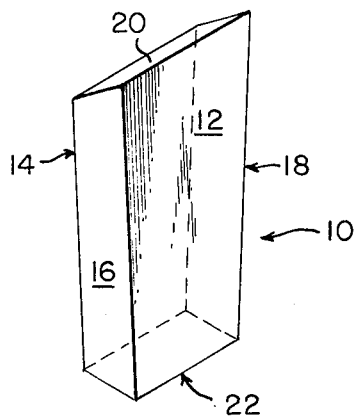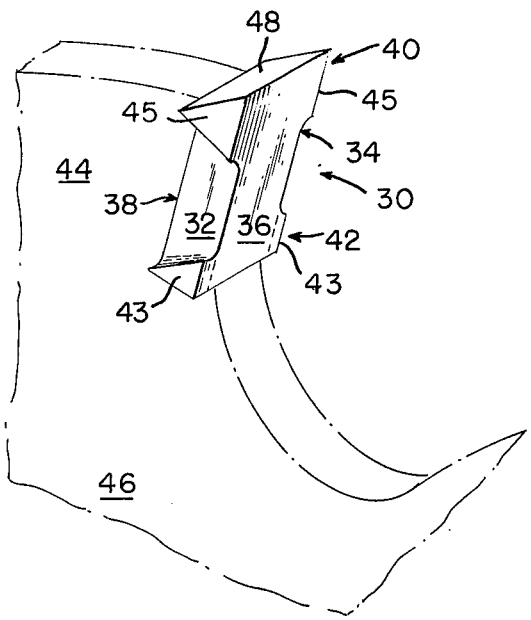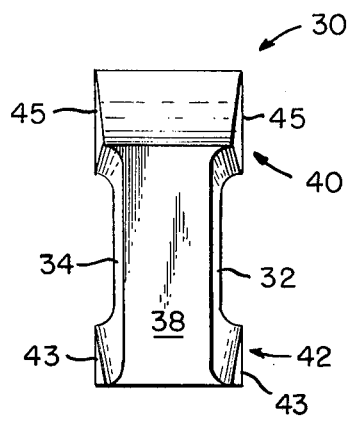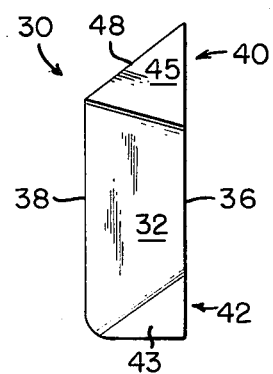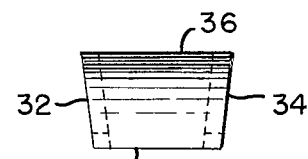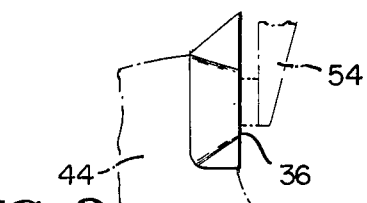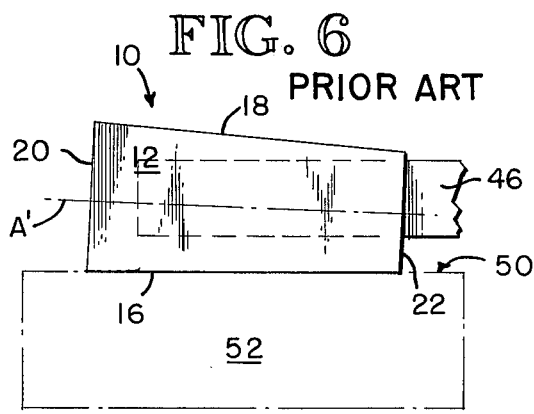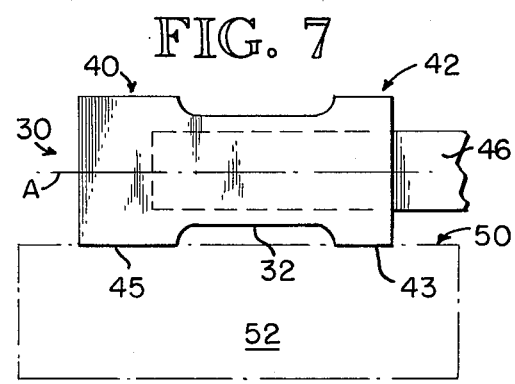

PRE-SHARPENED CUTTING TIP FOR SAW PLATE

BACKGROUND OF THE INVENTION

1. Field of the Invention

This invention relates to pre-sharpened cutting tips for a saw plate which can be accurately brazed onto the saw plate. The configuration of the saw tips also provides relatively low friction between the saw blade and workpiece.

2. Description of the Prior Art

Cutting tips, generally of tungsten carbide, are commonly brazed onto the working edges of a saw plate to increase the useful life of the saw blade. Generally, the tips are formed in a die and then sintered under heat to bond the ingredients together. Since a certain amount of shrinkage occurs during sintering, the carbide tips vary in all dimensions and their edges are not sharp. Die-forming is equally ineffective since this material does not readily lend itself to the creation of sharp edges. The edges of the cutting tips have a tendency to be slightly rounded or chamfered, and must be ground to produce an edge sufficiently keen to sever the wood fibers or other materials to be cut by the saw blade. The grinding operation is generally performed after the tips have been brazed onto the saw plate. During the grinding operation, all exposed surfaces of the tip are ground. The sides are ground with a slight taper from front face to back, as well as a taper from top to bottom. This geometry provides clearance so that the friction between the tip and the workpiece is relatively low, to prevent the saw from binding in the cut.

It is both difficult and time-consuming to sharpen the tips after they are brazed onto the saw plate since the grinding machinery must be set up for each face of each tip. Although the tips may be sharpened prior to brazing them onto the saw plate, the tapered sides of the tips make it extremely difficult to properly install them. The taper causes the tip to locate incorrectly with reference to the parallel sides of the saw plate. Thus, as a practical matter, conventional tips are sharpened after brazing onto the saw plate.

Cutting tips having non-tapered, i.e., parallel, sides may be ground prior to being brazed onto a saw plate; however, the non-tapered tips tend to bind during cutting operations and require increased power to rotate the saw blade.

SUMMARY OF THE INVENTION

An object of this invention is to provide a pre-sharpened cutting tip which can be correctly brazed onto a saw plate.

Still another object of the invention is to provide pre-sharpened cutting tips which, when installed in a saw plate, resist binding in the cut during cutting.

These and other objects of the invention are provided by a pre-sharpened cutting tip having equal widths at the ends of the tip and a reduced width midsection. The tip is brazed onto a saw plate by placing the axis of the tip along a line parallel to the plane of the saw blade and laterally moving the tip to align its axis with the saw plate. Since both ends of the tip are of equal width, the sides of the tip are parallel to the axis of the tip. The reduced-width midsection prevents the cutting tip from binding or seizing in the cut during a cutting operation and reduces the power required to drive the saw blade.

BRIEF DESCRIPTION OF THE DRAWINGS

FIG. 1 is an isometric view of a conventional cutting tip.

FIG. 2 is an isometric view of the cutting tip described in this application installed into a saw blade.

FIG. 3 is a back plan view of the cutting tip of FIG. 2.

FIG. 4 is a side elevational view of the cutting tip of FIG. 3.

FIG. 5 is an end elevational view of the cutting tip of FIG. 3.

FIG. 6 is a schematic drawing illustrating problems encountered in brazing conventional tapered cutting tips onto a saw plate.

FIG. 7 is a schematic drawing illustrating the installation of the cutting tip of FIG. 3 onto a saw plate.

FIG. 8 is a side elevational view illustrating the saw tip polishing procedure after the tip is installed into a saw plate.

DETAILED DESCRIPTION OF THE INVENTION

The prior art cutting tip 10 is of a prismatoidal shape having rectangular front and rear faces 12, 14, trapezoidal lateral faces 16, 18 and rectangular end faces 20, 22. The tip 10 is generally of tungsten carbide and is die-formed and subsequently sintered under heat to bond the ingredients together.

The cutting tip illustrated in FIGS. 2 through 5 also has an overall prismatoidal shape, a prismatoid being a polyhedron having for front and back faces two polygons in parallel planes, and for lateral and end faces triangles or trapezoids with one side or vertex lying in the front face, and the opposite side or vertex lying in the back face, of the polyhedron. However, its sides or lateral faces 32, 34 are recessed at the midpoint between front and back faces 36, 38. The recessed portion forms a tip body which divides the tip 30 into two ends — a cutting end 40 and a stabilizing end 42. The lateral faces 32, 34 are tapered inwardly from the front face 36 to the rear face 38 to provide clearance between the lateral faces 32, 34 and the workpiece. This clearance lowers the friction between the tip and a workpiece, and reduces the tendency of the saw to seize or bind in the cut.

As illustrated in FIG. 2, a notch is ground into the saw plate tooth area 44, and a tip 30 is brazed in the notch with the rear face 38 of the tip 30 abutting the front face of the notch. As the saw blade 46 rotates, the front face 36 of the cutting end 40 contacts the workpiece (not shown). The end face 48 at the cutting end 40 is beveled inwardly away from the front face 36 so that the end face 48 does not normally contact the workpiece. The full width of the lateral faces 32, 34 forms alignment surfaces 43, 45. The alignment surfaces 43 of the stabilizing end 42 contact the sides of the cut and act as a guide for the tips, thereby increasing the stability of the saw blade 46. If desired, the alignment surfaces 43 may be ground flush with the recessed portion of the lateral faces 32, 34 after the tip 30 has been installed into the notch. Removal of these surfaces 43 further reduces friction between the blade 46 and workpiece.

Although the cutting tip is shown here installed on a circular saw blade, it is understood that the tip may also be advantageously installed on other type saws.

As mentioned earlier, the cutting tip 30 is sharpened on surfaces 43, 45, 48 prior to installation on the saw plate. As illustrated in FIG. 7, one set of alignment surfaces 43, 45 is placed on the top planar surface 50 of a brazing mount 52. Since the surfaces 43, 45 contacting the mount 52 are spaced from the central axis A of the tip 30 by equal distances, the central axis A is parallel to the planar surface 50. By placing the saw plate 46 in parallel relation with the planar surface 50 and spacing it therefrom the proper distance, the tip 30 is positioned with the central axis A of the tip 30 aligned with the saw plate 46. After the tip 30 is brazed to the plate 46, it need only be polished with a polishing device 54 on the front face 36, as shown in FIG. 8, prior to use.

A conventional cutting tip 10, as shown in FIG. 1, is ground to the shape shown in FIG. 6 prior to use. The lateral faces 16, 18 are tapered inwardly from the top end face 20 to the bottom end face 22. Unlike the cutting tip 30, conventional tips 10 cannot be ground prior to installation into a saw plate. Instead, they must be ground after installation onto the plate. As illustrated in FIG. 6, when the conventional tip 10 is placed on the planar surface 50 of the brazing mount 52, its central axis A' is not parallel to the planar surface 50. For this reason, the saw plate 46, when positioned parallel to the planar surface 50, cannot be aligned with the central axis A' of the cutting tip 10. All exposed faces of the cutting tip 10 must be ground subsequent to installation of the tip into the saw blade. For each tip on the blade, four faces must be ground, requiring a grinder setup procedure to be performed four times for each tip. In contrast, the cutting tip described requires polishing on only one face.

The embodiments of the invention in which a particular property or privilege is claimed are defined as follows:

1. A pre-sharpened, integrally formed cutting tip for insertion into the working edge of a saw blade, said tip comprising:
    a tip body having an axis defining the central axis of said tip;
    a cutter end containing a cutter edge formed at one end of said tip body, said cutter end being wider than a portion of said tip body and terminating in a planar surface laterally offset from said central axis; and
    a stabilizing end formed at the other end of said tip body, said stabilizer end having an alignment surface laterally offset from the central axis by a distance substantially equal to the lateral offset of said cutter end so that the central axis of said tip may be aligned parallel to the plane of a saw plate placed along a line.

2. The cutting tip of claim 1 wherein the central axis intersects said cutter and stabilizing ends at their lateral centers.

3. The cutting tip of claim 1 wherein all of said ends project equally beyond the sides of the saw plate.

4. A pre-ground, integrally formed cutting tip for insertion into the working edge of a saw plate, said tip having the overall shape of a prismatoid with trapezoidal front and back faces and trapezoidal lateral and end faces, said lateral faces having a recessed portion.

5. The cutting tip of claim 4 wherein the overall shape of said back face is rectangular and adapted to abut the saw plate, and said lateral faces are tapered inwardly toward the back face so that the friction between a workpiece and the lateral faces of said cutting tip toward the back face is less than the friction away from the back face.

6. The cutting tip of claim 5 wherein the overall shape of both of said faces is rectangular.

* * * * *